United States Patent

[11] 3,634,096

[72] Inventor Lauro Ferrarini
 Via Rivaltella, 3, Reggio Emilia, Italy
[21] Appl. No. 737,625
[22] Filed June 17, 1968
[45] Patented Jan. 11, 1972
[32] Priority July 28, 1967
[33] Italy
[31] 33581 A/67

[54] PROCESS FOR COOKING SALTED MEATS
 1 Claim, 1 Drawing Fig.
[52] U.S. Cl. ................................................ 99/107
[51] Int. Cl. ............................................... A22c 18/00
[50] Field of Search .......................................... 99/1, 107, 325, 331

[56] References Cited
UNITED STATES PATENTS
3,259,056  7/1966  King ............................ 99/325
OTHER REFERENCES
Beeton, " All-About Cookery," 1923, published by Ward, Lock & Co., Limited, London, pages 233 and 234, article entitled Meat.

Primary Examiner—Hyman Lord
Attorneys—Guido Modiano and Albert Josif

ABSTRACT: This disclosure relates to a process for heat processing salted meats, particularly hams, shoulders or other parts of pig or other animal, in which said salted meat is brought into contact with a heating medium, then separated from said heating medium and subsequently allowed to cool.

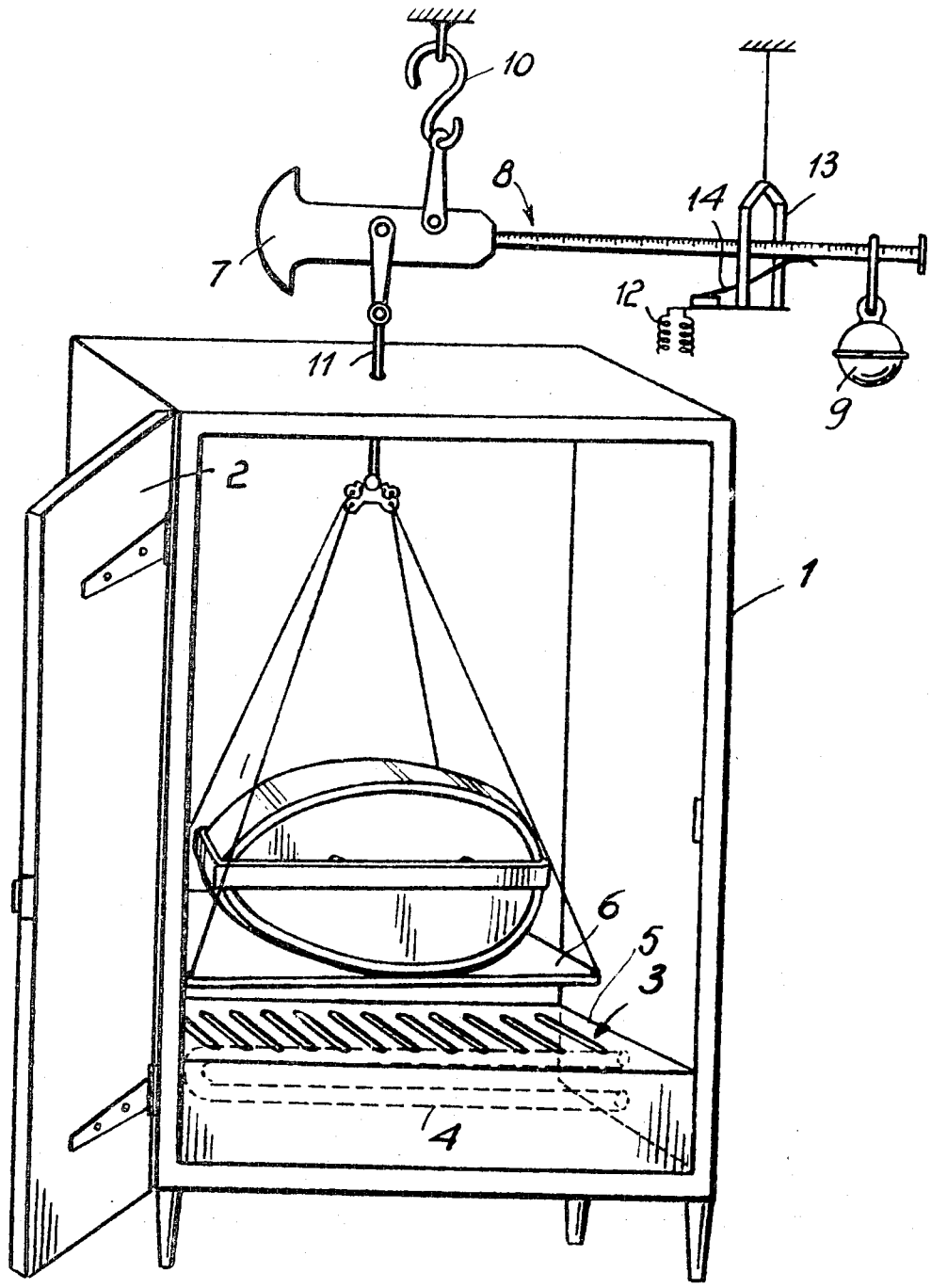

PROCESS FOR COOKING SALTED MEATS

BACKGROUND OF THE INVENTION

The present invention relates to a process for heat processing salted meats, particularly hams, shoulders or other parts of pig or other animal.

One of the most considerable difficulties which is encountered in heat processing of salted meats, particularly hams, is the determination of that degree of cooking at which a finished product is obtained having the best qualities obtainable with the starting materials employed.

The heat processing time necessary in order to obtain this best degree of cooking is extremely variable and depends on many factors such as, for instance, the quality and size of the starting meat which is to be heat processed, the cooking temperature, the type of heat processing apparatus employed, the age of the animal, and the presence of polyphosphate or other additives.

Consequently, according to the present practices, only highly specialized persons of considerable experience have been able to judge the correct moment in which the cooking of the ham should be stopped in order to obtain a cooked ham having the best obtainable technical and economic qualities.

Until now the industrial production of hams has been based on the evaluation of cooking times, and the determination of the cooking time gives rise to a considerable problem because of its variability. It has consequently been necessary to employ highly specialized staff who also have to make frequent tests of the degree of cooking, and it often happens that, despite all the experience of the person who controls the cooking, it is not possible to obtain a technically constant production.

SUMMARY OF THE INVENTION

The main object of the invention is that of obviating this inconvenience by providing a process which does not necessitate the evaluation of cooking times in the cooking process and enables the unequivocable establishment of the point in which the best obtainable degree of cooking is reached.

Another object of the invention is that of providing an apparatus for performing the process according to the invention.

According to the invention there is provided a process for heat processing salted meats, particularly hams, shoulders or other parts of pig or other animals, in which said salted meat is brought into contact with a heating medium, then separated from said heating medium and subsequently allowed to cool, characterized in that during the phase of contact with said heating medium the meat is weighed and left to cook until the loss in weight of said meat with respect to the initial weight of said meat reaches a preestablished value.

The apparatus for performing the process according to the invention comprises at least one heat processing chamber suitable to receive at least one piece of meat to be cooked, heating means in communication with said chamber characterized in that at least one weighing means is arranged in said chamber, said weighing means being responsive to the change of weight of the piece of meat to be heat processed in said chamber.

BRIEF DESCRIPTION OF THE DRAWING

In the accompanying drawing, the single FIGURE is a perspective elevation view of one embodiment of apparatus for performing the process according to the invention.

DETAILED DESCRIPTION OF THE INVENTION

The applicant has found that there exists a well defined correlation between said loss in weight and the degree of cooking obtained.

The applicant has further found that if the loss in weight is calculated with respect to the unit weight, for example in percentages, the best degree of cooking achieved in the cooking process is a well defined function of said loss in weight, is independent of the weight of the piece of meat to be cooked and the temperature and pressure of cooking, and is independent, within strict limits, solely on the type of initial meat.

If the meat is subjected to conventional treatments, for example curing or salting, the addition of polyphosphates and the like, before cooking, such treatments do not affect the selected value of the loss of weight but only affect the final technical qualities of said meat.

Knowing the values of said function, that is the loss of unit weight for each type of starting meat, it is possible to establish the desired or programmed or planned degree of cooking.

The applicant has found that the desired results may only be obtained if the loss in weight is calculated with respect to the weight of the piece of fresh meat after butchering and cutting up, and anyway before the processing thereof.

It will be appreciated that it is necessary to take into account any meat which is added or removed in order to fill the ham molds or to trim away excessive fat or other technical reasons.

The applicant has carried out numerous experiments and trials which have all confirmed the principle of the invention.

The results of some of the most significant examples of such experiments are shown in tabular form in the accompanying table.

In said table the horizontal rows, indicated with Roman numerals, are intended to be interpreted as follows:

I = number of Example
II = age of the butchered animal in months
III = time passed between slaughter and cutting up with simultaneous weighing, in days
IV = weight in kilograms of the meat to be heat processed, at the moment of sectioning
V = increase of weight in kilograms due to the effect of salt curing by intravenous syringing or pumping (at 12 percent)
VI = increase of weight in kilograms due to the effect of salt curing by intramuscolar syringing or pumping (at 12 percent)
VII = increase of weight due to curing by immersion in brine
VIII = increase of weight due to dry salt curing
IX = duration of curing in hours
X = loss of weight due to boning in percent and in kilograms
XI = calculated weight value marked at the start of heat processing and determining the desired or programmed or planned degree of cooking (such weight value being obtained by subtracting the resultant of the fresh weight multiplied by the desired percentage loss in weight and the cooling factor from the fresh weight). The cooling factor or correction coefficient depend on the processing system and equipment and may be determined with some tests.
XII = calculated loss of weight
XIII = cooling factor
XIV = heat processing temperature
XV = pressure in the heat processing chamber
XVI = loss of weight of heat processed meat weighed after 24 hours of cooling, expressed in percentage
XVII = desired loss of weight expressed in percentage
XVIII = loss of weight of cooked meat weighed after 24 hours of cooling expressed in kilograms
XIX = loss of weight of cooked meat weighed after 24 hours of cooling with exclusion of deboning expressed in percentage.

Example 1 relates to tests on 5 hams of "Large White" breed of pig
Example 2 relates to tests on 5 shoulders of "Large White" breed of pig
Example 3 relates to tests on 5 hams of "Landrace" breed of pig
Example 4 relates to tests on 5 shoulders of "Landrace" breed of pig
Example 5 relates to tests on 5 "zamponi" (stuffed trotters) made with meat of "Large White" breed of pig
Example 6 relates to tests on 5 "cotechini" (spiced Italian sausage) made with meat of "Large White" breed of pig.

TABLE

| I | 1 | 2 | 3 | 4 | 5 | 6 |
|---|---|---|---|---|---|---|
| II |  |  |  |  |  |  |
| III | 11 | 11 | 5 | 5 | 11 | 11 |
| IV | 2 | 2 | 2 | 2 | 2 | 2 |
| V | 56.50 | 40.30 | 38.90 | 24.50 | 6.00 | 2.60 |
| VI |  | 4.80 |  |  |  |  |
| VII |  |  |  | 2.90 |  |  |
| VIII |  | 2% 0.90 | 3.9% 1.50 | 2.4% 0.50 |  |  |
| IX | 0 |  |  |  | 0.15 | 0.065 |
| X | 672 | 96 | 480 | 96 | 48 | 48 |
| XI | 9.8% 5.5 | 12.41% 5.0 | 8.74% 3.40 | 10.6% 2.60 |  |  |
| XII | 50.80 | 36.80 | 35.00 | 22.00 | 4.95 | 2.08 |
| XIII | ¹10 | ¹10 | ¹10 | ¹10 | 17.5 | ¹20 |
| XIV, degrees | 0.5 | 0.6 | 0.5 | 0.6 | 0.8 | 0.8 |
| XV, mm. Hg | 85 | 85 | 80 | 80 | 90 | 90 |
| XVI, percent | 760 | 760 | 760 | 760 | 760 | 760 |
| XVII, percent | 20.20 | 16.88 | 20.30 | 17.10 | 22.45 | 25.20 |
| XVIII |  | 17 | 20 | 17 | 22 | 25 |
| XIX, percent | 45.10 | 30.80 | 31.00 | 20.30 | 4.70 | 1.90 |
|  | 10.40 | 4.47 | 11.56 | 6.50 |  |  |

¹ Percent.

The formula for determining the weight to program is:
$A = B - (B \times C \times D)$
where:
- A = programmed weight (row XI)
- B = weight of fresh meat (row IV)
- C = desired percentage loss of real weight (row XVI)
- D = cooling factor or correction coefficient.

Given:
- a weight of fresh meat of 100 kg.
- a desired real weight loss of 20 percent
- a cooling constant of 0.5.

The programmed weight will be given by
$A = 100 - (100 \times 0.20 \times 0.5)$
i.e. $A = 100 - 10$
i.e. $A = 90$.

From the illustrated Examples, it may be established that the programmed loss of weight varies within strict limits and its value may readily be determined on the basis of the type of the initial meat.

With reference to the drawing, one of the possible apparatuses for carrying out the described process comprises a heat processing chamber or oven 1 with a door 2. In the bottom of said chamber 1 is provided a tank 3 containing water. In said tank is arranged an electric resistance 4 which is designed to heat said water sufficiently to produce steam for cooking.

Said tank 3 is provided with a grilled top cover 5 through which said steam passes.

In said chamber 1 is arranged the scale pan 6 of a balance 7, along which lever or measuring rod 8 a weight 9 slides.

Said balance 7 is suspended from a hook 10 and said scale pan 6 is suspended from said measuring rod 8 by means of a rod 11 which is slidably arranged in a hole provided in the top of said chamber 1. The ham to be heat processed is placed on said scale pan 6.

A microswitch 12 is secured on a stirrup 13 whose upper end is suspended from a fixed point. Said microswitch 12 has a contact strip 14 which lies in the plane of oscillation of said measuring rod 8 of the balance 7.

Said microswitch 12 interrupts the flow of current through said heating element 4 and controls a sound signal device (not shown).

The working of the apparatus is as follows.

The ham is introduced into the cooking chamber 1 and arranged on the scale pan 6. Knowing in advance the programmed weight of the ham, the sliding weight 9 of the balance 7 is pre-arranged at the point of said lever 8 in which the equilibrium of the balance will occur when the weight of the ham falls to the preestablished or programmed value. Consequently, at first, the free end of lever 8 of the balance 7 rises and strikes the top of said stirrup 13 which acts as a stop.

The door 2 of the cooking chamber 1 is then closed and the ham is cooked until the weight falls to the programmed value. When the programmed value is reached, the lever 8 assumes a horizontal position and automatically acts on the microswitch 12 through the contact strip 14 and thus causes the flow of current through said heating element 4 to be stopped and actuates the sound signal device in order to indicate the end of the cooking process.

While one embodiment of apparatus has been described, various modifications and variations are possible, within the scope of the appended claims.

Thus, for example, the scale pan could be incorporated in the bottom of the cooking chamber and other heating systems could be employed. The cooking chamber could also be provided with humidity and temperature conditioning systems.

I claim:

1. A method for cooking salted meats comprising the steps of measuring the weight of the meat to be cooked, subjecting the meat to the action of a heating medium, removing the heating action when the meat has reached a programmed cooking degree, and allowing then the meat to cool, wherein according to the improvement, before the start of the heating action a calculated weight value of the meat to be cooked is determined, whereby the weight of the meat is measured during the heating action and the heating action is removed when the weight of the meat reaches said predetermined calculated weight value.